US011400378B2

(12) United States Patent
Dorn et al.

(10) Patent No.: US 11,400,378 B2
(45) Date of Patent: Aug. 2, 2022

(54) AUTOMATIC SEPARATION OF ABUSIVE PLAYERS FROM GAME INTERACTIONS

(71) Applicant: Sony Interactive Entertainment LLC, San Mateo, CA (US)

(72) Inventors: Victoria Dorn, San Mateo, CA (US); Elke Wiggeshoff, San Mateo, CA (US); Angelica Advincula, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 102 days.

(21) Appl. No.: 16/917,797

(22) Filed: Jun. 30, 2020

(65) Prior Publication Data

US 2021/0402304 A1 Dec. 30, 2021

(51) Int. Cl.
| | | |
|---|---|---|
| A63F 13/75 | (2014.01) | |
| A63F 13/35 | (2014.01) | |
| A63F 13/79 | (2014.01) | |
| G06N 20/00 | (2019.01) | |
| G06N 5/04 | (2006.01) | |

(52) U.S. Cl.
CPC .............. *A63F 13/75* (2014.09); *A63F 13/35* (2014.09); *A63F 13/79* (2014.09); *G06N 5/04* (2013.01); *G06N 20/00* (2019.01); *A63F 2300/5546* (2013.01); *A63F 2300/5586* (2013.01)

(58) Field of Classification Search
None
See application file for complete search history.

(56) References Cited

U.S. PATENT DOCUMENTS

| | | | | |
|---|---|---|---|---|
| 2009/0111583 | A1* | 4/2009 | Zalewski | A63F 13/75 463/42 |
| 2009/0174702 | A1* | 7/2009 | Garbow | G06Q 50/265 345/419 |
| 2010/0081508 | A1* | 4/2010 | Bhogal | A63F 13/73 463/40 |
| 2010/0105484 | A1* | 4/2010 | Horneff | A63F 13/79 463/43 |
| 2018/0207535 | A1* | 7/2018 | Seo | A63F 13/35 |
| 2019/0089731 | A1* | 3/2019 | Park | H04L 63/1416 |
| 2019/0355058 | A1* | 11/2019 | Huang | G06Q 20/386 |
| 2021/0370188 | A1* | 12/2021 | Thomas | A63F 13/87 |

* cited by examiner

*Primary Examiner* — Jason T Yen
(74) *Attorney, Agent, or Firm* — Penilla IP, APC

(57) ABSTRACT

A method performed by at least one server computer is provided, including: during interactive gameplay of a multi-player video game, processing game state data to identify gameplay activity of a player as being abusive; responsive to the identifying the gameplay activity as being abusive, then applying a corrective action to the player during the interactive gameplay, the corrective action providing an indication to the player of the gameplay activity that was identified as being abusive; after applying the corrective action, further processing the game state data to identify additional gameplay activity of the player as being abusive; responsive to the identifying the additional gameplay activity as being abusive, then applying a penalty to the player.

11 Claims, 13 Drawing Sheets

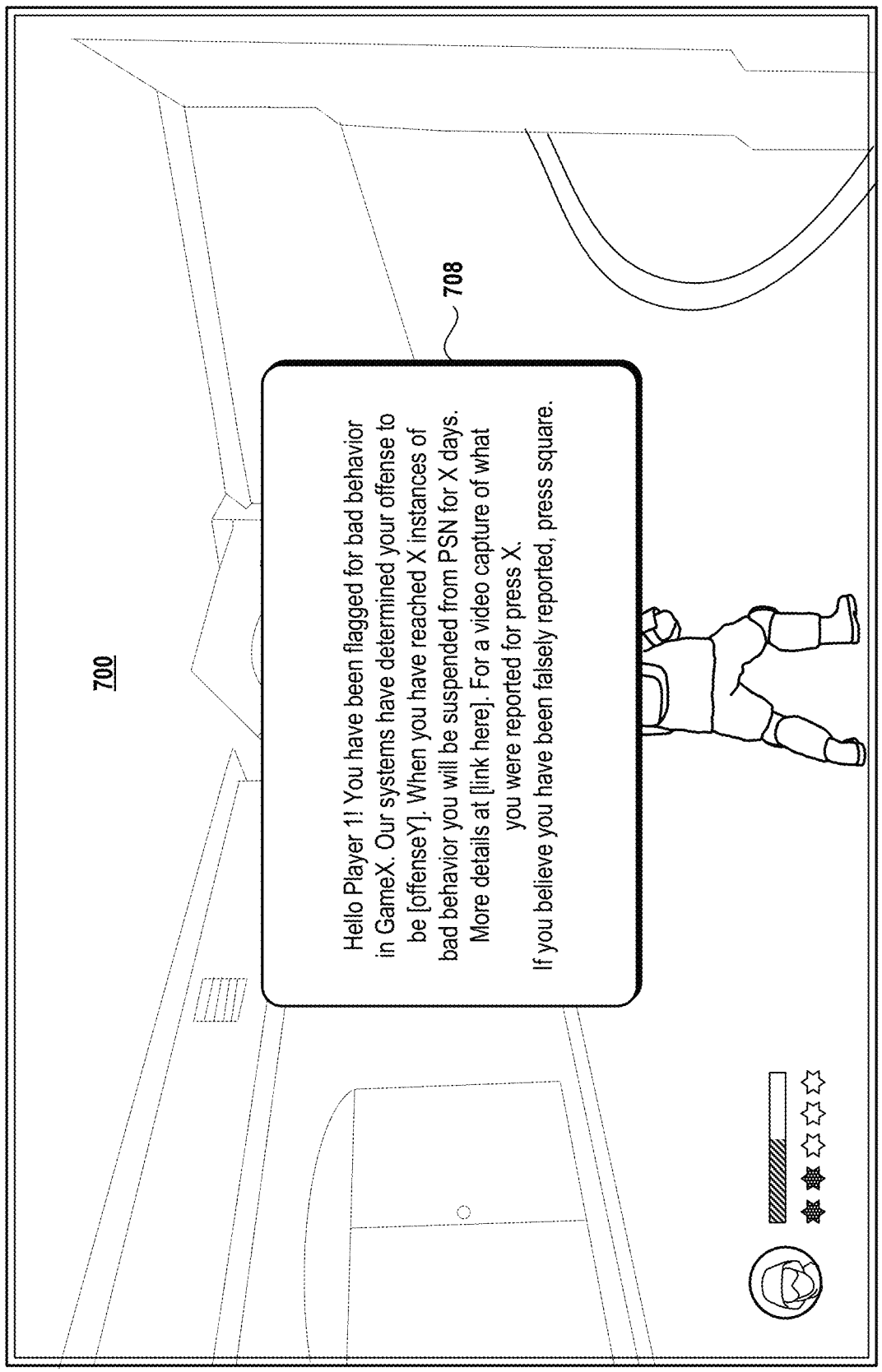

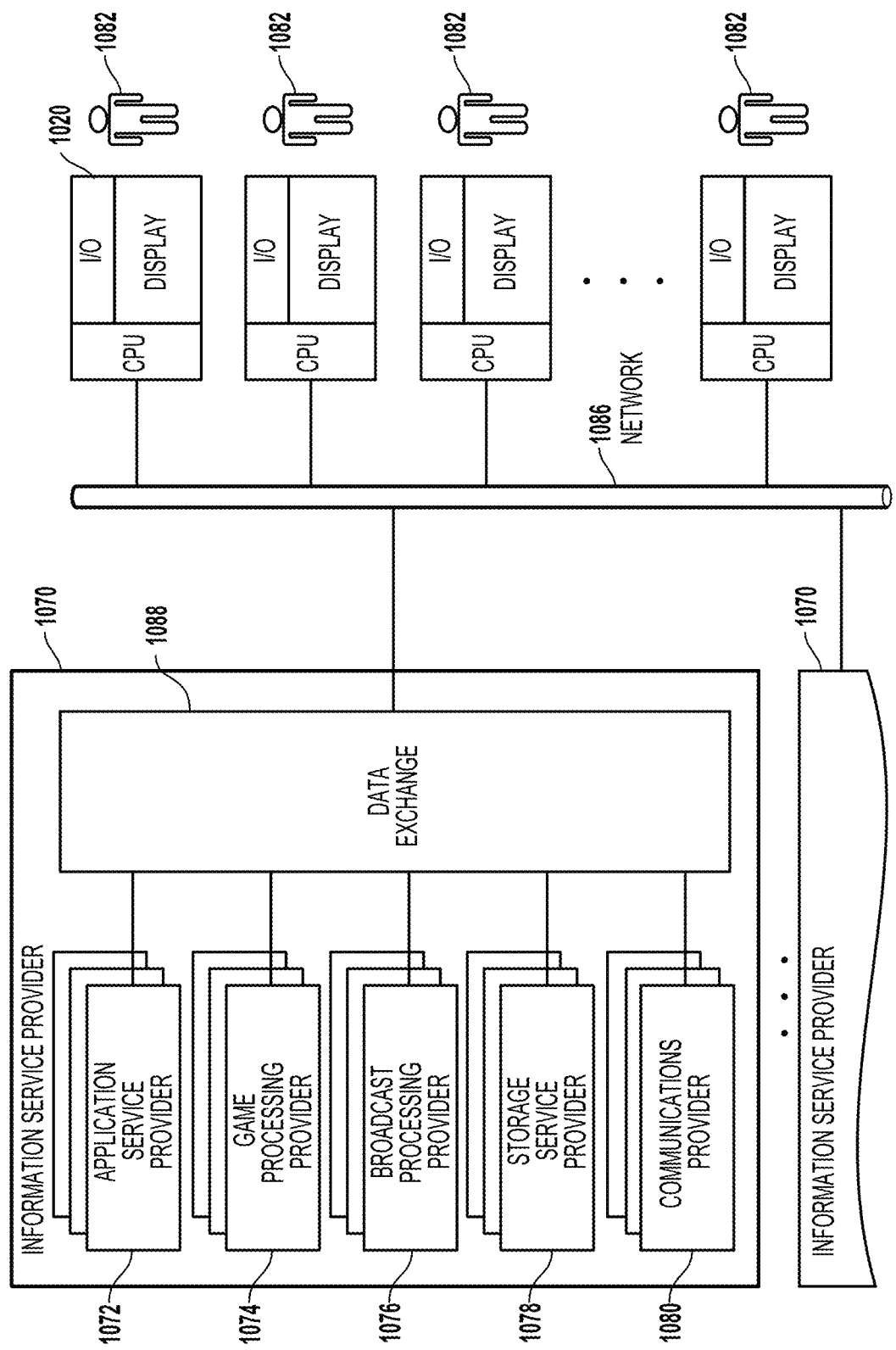

AUTOMATIC SEPARATION OF ABUSIVE PLAYERS FROM GAME INTERACTIONS

BACKGROUND

Field of the Disclosure

The present disclosure relates to systems and methods for automatic separation of abusive players from game interactions in multiplayer video games.

Description of the Related Art

An area of continued development in the gaming industry is that of multi-player gaming, which is capable of providing collective gaming experiences to players that are geographically remote from each other. An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for automatic separation of abusive players from game interactions in multiplayer video games.

In some implementations, a method performed by at least one server computer is provided, including: during interactive gameplay of a multi-player video game, processing game state data to identify gameplay activity of a player as being abusive; responsive to the identifying the gameplay activity as being abusive, then applying a corrective action to the player during the interactive gameplay, the corrective action providing an indication to the player of the gameplay activity that was identified as being abusive; after applying the corrective action, further processing the game state data to identify additional gameplay activity of the player as being abusive; responsive to the identifying the additional gameplay activity as being abusive, then applying a penalty to the player.

In some implementations, the corrective action includes a warning indicating the penalty to the player.

In some implementations, the penalty includes reducing a gameplay functionality of the player.

In some implementations, the penalty includes migrating the player to a different session or server of the multi-player video game.

In some implementations, the penalty includes identifying a breakpoint in the interactive gameplay, the migrating being performed upon reaching the breakpoint.

In some implementations, identifying the gameplay activity of the player as being abusive includes receiving a flag initiated by a second player of the multi-player video game in response to the gameplay activity of the player.

In some implementations, identifying the gameplay activity of the player as being abusive includes analyzing in real-time, by a machine learning model, the interactive gameplay of the multi-player video game.

In some implementations, a method performed by at least one server computer is provided, including: during interactive gameplay of a first session of a multi-player video game, processing game state data to identify gameplay activity of a player as being abusive; responsive to the identifying the gameplay activity as being abusive, then migrating the player to a second session of the multi-player video game.

In some implementations, further responsive to identifying the gameplay activity as being abusive, then identifying a breakpoint in the interactive gameplay, the migrating being performed upon reaching the breakpoint.

In some implementations, the breakpoint is defined by one or more of a completion of a stage or event of the multi-player video game, a transition between spaces of a virtual environment by the player, a death of the player in the interactive gameplay.

In some implementations, migrating the player includes capturing settings associated to the player in the first session, and initiating the player in the second session with the captured settings.

In some implementations, migrating the player includes capturing a state of the first session of the multi-player video game, and configuring the second session to substantially replicate at least a portion of the state of the first session in the second session without other players of the first session.

In some implementations, identifying the gameplay activity of the player as being abusive includes receiving a flag initiated by a second player of the multi-player video game in response to the gameplay activity of the player.

In some implementations, identifying the gameplay activity of the player as being abusive includes analyzing in real-time, by a machine learning model, the interactive gameplay of the multi-player video game.

In some implementations, a method performed by at least one server computer is provided, including: during interactive gameplay of a first session of a multi-player video game, receiving a flag initiated by a first player of the multi-player video game in response to gameplay activity of a second player, the flag configured to identify the gameplay activity of the second player as potentially abusive; responsive to receiving the flag, processing recorded gameplay of the multi-player video game to verify the gameplay activity of the second player as being abusive; responsive to the verifying the gameplay activity of the second player as being abusive, then migrating the second player to a second session of the multi-player video game.

In some implementations, further responsive to verifying the gameplay activity of the second player as being abusive, then identifying a breakpoint in the interactive gameplay, the migrating being performed upon reaching the breakpoint.

In some implementations, the breakpoint is defined by one or more of a completion of a stage or event of the multi-player video game, a transition between spaces of a virtual environment by the second player, a death of the second player in the interactive gameplay.

In some implementations, migrating the second player includes capturing settings associated to the second player in the first session, and initiating the second player in the second session with the captured settings.

In some implementations, migrating the second player includes capturing a state of the first session of the multi-player video game, and configuring the second session to substantially replicate at least a portion of the state of the first session in the second session without other players of the first session.

In some implementations, verifying the gameplay activity of the second player as being abusive includes analyzing, by a machine learning model, the interactive gameplay activity of the second user.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 7B illustrates the player view of the video game after analysis of the captured data, in accordance with the implementation of FIG. 7A.

FIG. 10 illustrates an embodiment of an Information Service Provider architecture, in accordance with implementations of the disclosure.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

A common problem in multi-player gameplay concerns how to address inappropriate or abusive actions by a given player. Such actions can include gameplay contrary to the spirit and principles of the video game, as well as activity that harasses or is inappropriate towards other players. Accordingly, implementations of the present disclosure provide methods and systems for detecting and addressing abusive gameplay. Such methods and systems can be useful in influencing correction of inappropriate behavior, so as to promote better gameplay experiences for players collectively.

In some implementations, abusive players are detected through player flagging, wherein players in a video game can flag abusive behavior for follow-up by the system. In some implementations, a machine learning model is trained to recognize abusive behavior, and further may suggest to the players when seemingly abusive behavior is recognized, to give the players the option to flag such behavior.

In some implementations, abusive players are automatically separated from a given multiplayer session or server of a video game. For example, an abusive player can be migrated to a different session or server in response to detecting abusive behavior on the part of the abusive player. Such migration of the abusive player can be managed in a manner so as to be seamless, or cause minimal interruption, to the abusive player and the other players in the video game. In some implementations, abusers are allowed to play games, but for those games, the abusers are focused to play together, separate from regular players that obey or work with the game mechanics to advance in the game. It is possible to switch abusive players to different servers, or different game instances or worlds, and such reassignment can be done in the background and not completely evident to the abusive player.

Figure 1:
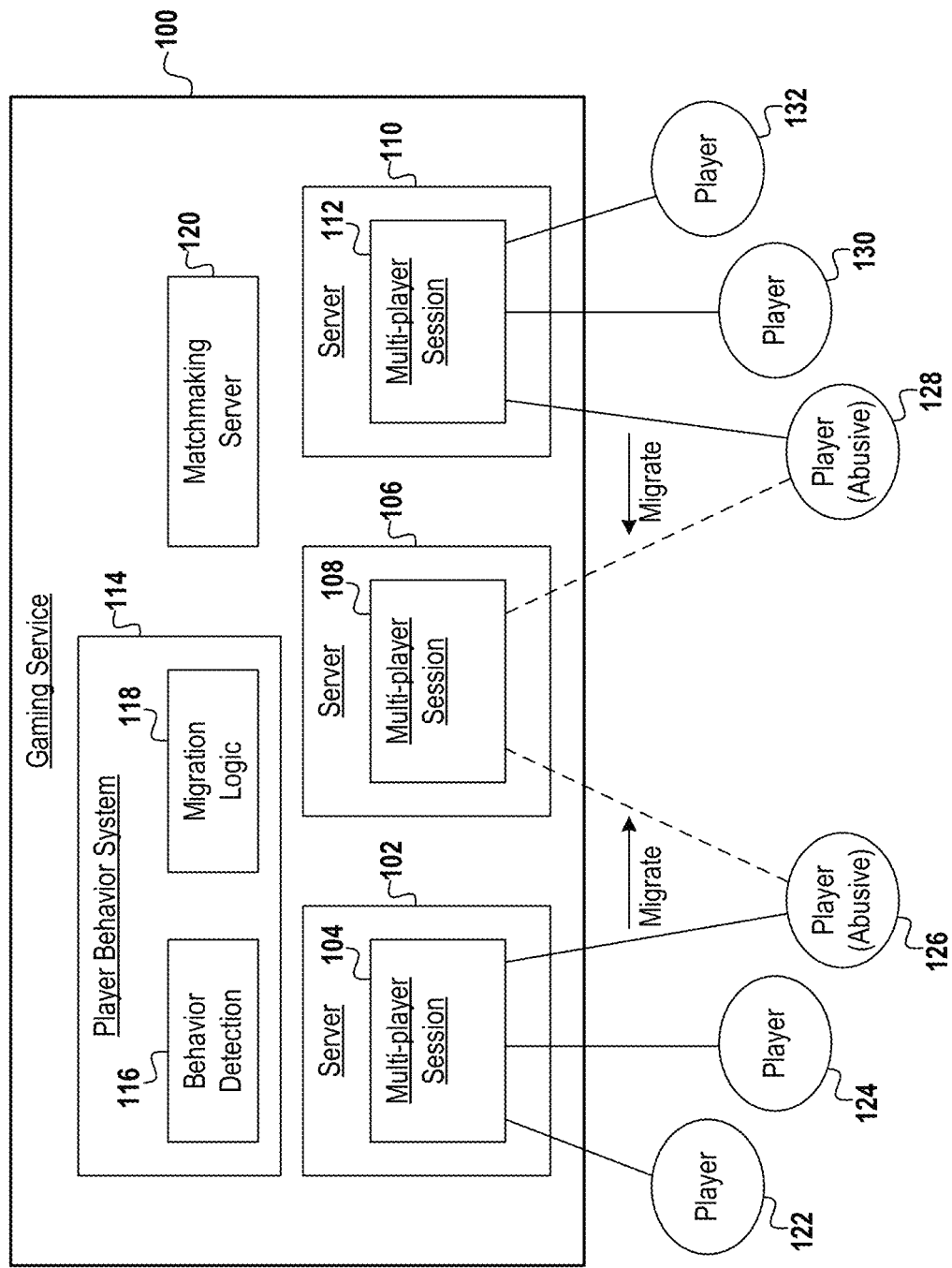
FIG. 1 conceptually illustrates automatic migration of abusive players to a different server/session of a multiplayer video game in accordance with implementations of the disclosure.

FIG. 1 conceptually illustrates automatic migration of abusive players to a different server/session of a multiplayer video game in accordance with implementations of the disclosure.

In the illustrated implementation, a gaming service 100 is configured to enable multiplayer gameplay of a video game. The gaming service 100 is typically accessed over a network, such as the internet, through player devices that are operated by respective players of the video game. In some implementations, the multiplayer video game is a cloud video game that is executed by the gaming service 100, with gameplay video and audio being streamed to the player devices. In other implementations, respective instances of the video game are locally executed by the player devices, and multiplayer gameplay is facilitated by the gaming service 100, with the sessions being synchronized through the gaming service.

As shown in the illustrated implementation, the gaming service hosts various servers 102, 106, and 110, which respectively execute multiplayer gameplay sessions 104, 108, and 112. In some implementations, the gaming service 100 further includes a matchmaking server 120, that is configured to provide a matchmaking service for multiplayer gameplay of the video game. That is, the matchmaking server 120 receives requests from players to join a multi-player session of the video game, and assigns the players to specific sessions of the video game based on criteria such as the players' respective skill levels or experience, balancing competitiveness of teams, geographic location of the players, language, etc.

For example, players 122, 124, and 126 in some implementations are assigned by the matchmaking server 122 the multiplayer gameplay session 104. In other implementations, the players can self-organize and determine which players are allowed to join a given session, such as by having a primary player form a team or host the multiplayer gameplay session, and invite other players to join. Thus, in the illustrated implementation, players 122, 124, and 126 are connected to the multiplayer gameplay session 104, and engaged in multi-player gameplay of the video game.

As has been noted, a problem in multiplayer gaming is that certain players can engage in abusive or inappropriate behavior. The actions of an abusive player degrade the gameplay experience for the other players of the video game. Hence, it is important to detect and address abusive behavior in multiplayer video games. To this end, the gaming service 100 further includes a player behavior system 114 that is configured to detect abusive behavior and address the abusive behavior through various mechanisms. The player behavior system 114 includes a behavior detection unit 116, which is configured to determine when abusive behavior by a given player occurs. In some implementations, the behavior detection unit 116 detects abusive behavior, at least in part, based on receiving flags or reports from players of a given session of the video game. In some implementations, the behavior detection unit 116 detects abusive behavior, at least in part, by using a machine learning model.

Broadly speaking, abusive behavior can include any type of inappropriate gameplay, or gameplay activity in bad faith, or inappropriate behavior occurring during gameplay by a given player. Examples of abusive behavior include, without limitation, the following: failing to engage in gameplay or being "AFK" (away from keyboard), playing in a manner damaging or detrimental to one's own team or to a fellow member of the team, playing in bad faith or inconsistent with the mechanics of the game, "griefing" or deliberately using aspects of the game in unintended ways to irritate/harass/annoy/harm other players, text/voice chat harassment (e.g. using harassing or explicit language or images), spamming text or voice chat channels, etc.

In the illustrated implementation, the player 126 has been identified as an abusive player that has performed abusive/inappropriate actions in the multi-player session 104 of the video game, these being detected by the behavior detection unit 116. In response, the player behavior system 114 may perform various actions, such as warning the player 126 that the abusive actions have been detected, advising them to stop such behavior, and notifying them of penalties that may be levied against them. In the present disclosure, various types of penalties are discussed, including migration as discussed below, which can be imposed in response to detecting and verifying abusive behavior. It will be appreciated that in some implementations, such penalties may be imposed after abusive behavior is repeated at least once (detected more than once), or after the player has received at least one warning.

In some implementations, the player behavior system 114 includes migration logic 118, which is configured to migrate an abusive player to another session of the video game. Continuing with reference to the illustrated implementation, in response to detecting abusive behavior by the player 126, then the migration logic 118 migrates the player 126 to a different multi-player session 108 executed by the server 106. In this manner, the abusive player 126 is thereby separated from the other players 122 and 124, so that the player 126 can no longer engage in abusive behavior that is detrimental or annoying to the players 122 and 124. As described in further detail below, the migration of the abusive player 126 can be configured to cause minimal interruption to the gameplay for the players 122 and 124, as well as for the abusive player 126.

In some implementations, the server 106 to which the abusive player 126 is migrated, is selected or configured so as not to further enable the abusive behavior by the player 126. Such configuration can take various forms depending upon the abusive behavior that has been performed by the player 126. For example, in some implementations it may be desirable to limit contact of the abusive player with other players so as to limit the capacity of the abusive player to perform inappropriate actions towards another player. Thus, the server to which the abusive player is migrated can be selected or configured as a server having significantly fewer players, or scarce numbers of players, or players that are widely dispersed, or even no other players, such that it becomes less likely that the abusive player will come in contact with other players, and thereby reducing the opportunities for the abusive player to perform inappropriate actions affecting other players.

In some implementations, the abusive behavior can entail exploiting or deliberately misusing a particular game mechanic of the video game in a way that is detrimental to other players on the same team or irritating to the other players. For example, the abusive player might exploit objects in a particular setting, or exploit the mechanics of a given location in a way that is in bad faith and inconsistent with appropriate gameplay. In view of this, the server to which the abusive player is migrated can be chosen or configured so as not to present a scenario that is conducive to such abusive behavior. For example, in some implementations the server to which the abusive player is migrated is selected or configured to present a substantially different location/scenario/scene/setting/world/level of the video game than the previous server, or one that does not contain the objects or settings which have been previously exploited by the abusive player.

In some implementations, an abusive player is migrated to a new server based at least in part on characteristics of the players on the new server, and/or characteristics of players on the previous server. For example, the abusive player may engage in abusive behavior to which less experienced players are more susceptible, and to which more experienced players are less susceptible. Accordingly, in some implementations, the abusive player is migrated to a server where the players have a higher skill level than players on the previous server. Extending the concept, characteristics of players that determine their susceptibility to given types of abusive behavior can be analyzed and correlated. Then, when a given type of abusive behavior is detected by an abusive player, the abusive player can be migrated to a server having players that exhibit characteristics which make them less susceptible to the detected type of abusive behavior. In this manner, an abusive player is moved to a session where it is more difficult for the abusive player to take advantage of other players in the same way.

Broadly extending the above concepts, it will be appreciated that in various implementations an abusive player can be migrated to a server/session in which conditions of the multiplayer video game are configured so as to reduce the likelihood of the abusive player engaging in the same type of abusive behavior as was previously detected in the prior server/session.

In some implementations, abusive players are migrated to the same session/server so that they play together with each other. For example, in the illustrated implementation, another multiplayer session 112 of the video game is instantiated by the server 110. Players 128, 130, and 132 are engaged in gameplay of the video game in the multiplayer session 112. During gameplay, abusive behavior on the part of the player 128 is detected by the behavior detection unit 116. In response, the abusive player 128 is migrated to the server 106. In this manner, the abusive player 128 is migrated to the same server as the abusive player 126, so that the abusive players are concentrated in the same session. By having the abusive players play together in the same session, they are not able to perform inappropriate actions on other players that are seeking to play the video game in good faith and in accordance with the appropriate mechanics of gameplay.

In some implementations, reassignment of the abusive player to a different server/session is performed in a way so as to preserve the continuity of the game for the abusive player and/or the other players. The abusive player may still wish to finish their game, too, so it may not be desirable to abruptly end their game. However, the abusive player has been identified and migration is sought, for example, because the abusive player is with others that they tend to abuse, or in a situation where they tend to play inconsistent with the game mechanics. Thus, in some implementations, aspects of the existing session are replicated/cloned/copied into the new session to which the abusive player is migrated.

For example, in some implementations, the digital inventory of the abusive player is replicated from the previous session, so that the abusive player possesses the same weapons, skins, armor, digital currency, virtual objects, etc. as they did in the previous session at the point of migration occurring. This way, the abusive player perceives continuity of their digital inventory even as they are migrated to the new session.

In some implementations, the abusive player is migrated to the same virtual location in the game world in the new session as their last location in the previous session at the time migration occurred. In some implementations, the abusive player will have the same orientation in the new session as their last orientation in the previous session. In some implementations, other aspects of the abusive player's previous gameplay experience in the prior session are replicated in the new session to which the abusive player is migrated. By way of example without limitation, such other aspects can include the presence and configuration of enemies or virtual characters, presence/location/condition of virtual objects, weather, music, game settings, etc.

It will be appreciated that when the abusive player is migrated, the remaining players do not migrate with the abusive player, so that the abusive player is separated from the other players. In some implementations, to further preserve continuity of gameplay for the abusive player and make the migration more transparent, AI replacement characters (or bots) are instantiated in the new session in place of the other players that are not migrated to the new session. The AI replacement characters can be configured to have the same or similar configurations to those of the other players from the previous session, such as having the same or similar appearances, skins, weapons, objects, etc. Furthermore, in some implementations, the AI replacement characters are configured to perform in a similar manner to the players for which they are inserted as substitutes. For example, the AI replacement characters can be configured to have similar gameplay to the players they represent, such as similar skill level, style of play, etc. This can make the experience of migration even more transparent to the abusive player.

Figure 2:
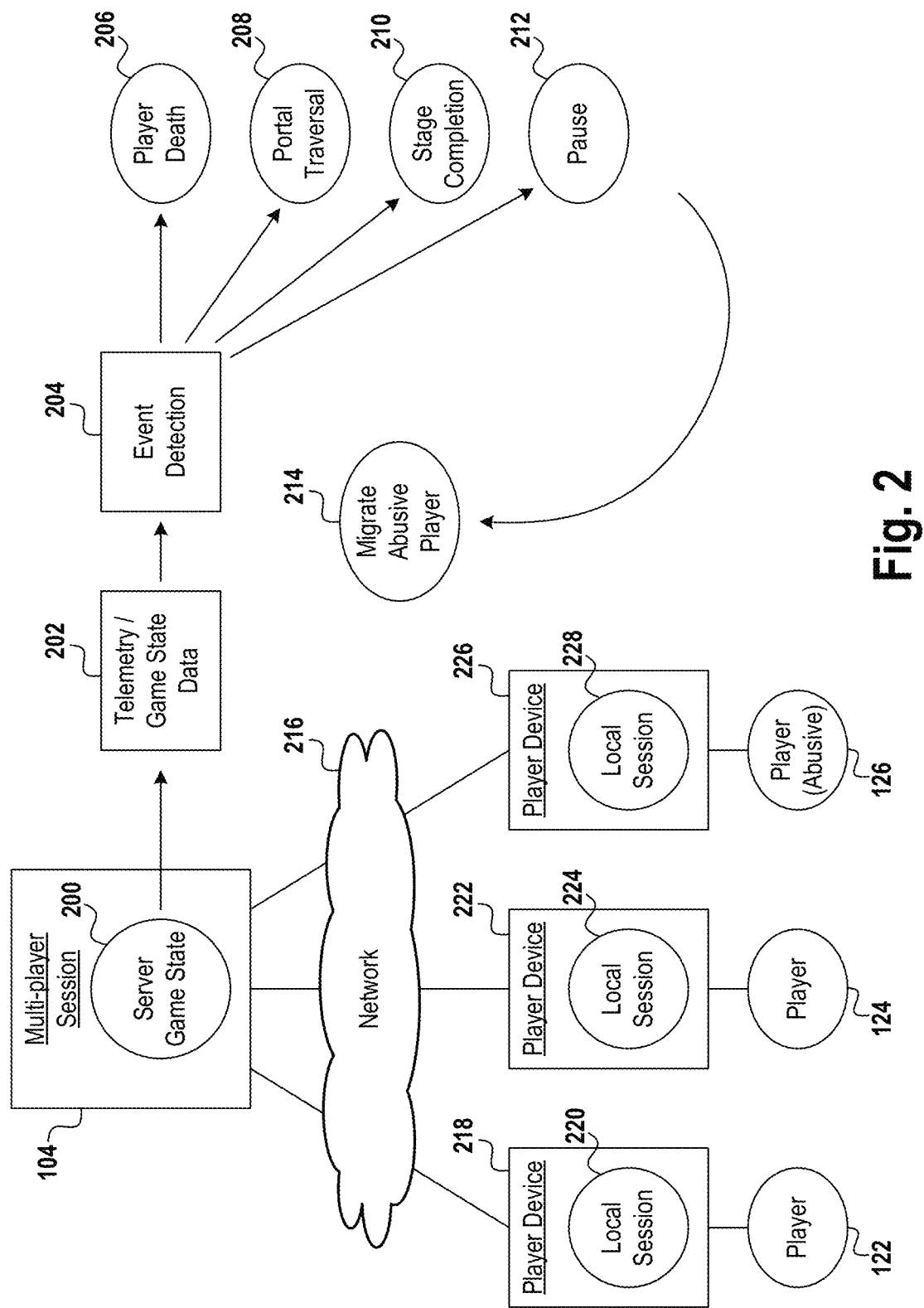
FIG. 2 conceptually illustrates detection of significant events or transition points at which to migrate an abusive player from an existing multi-player game session, in accordance with implementations of the disclosure.

FIG. 2 conceptually illustrates detection of significant events or transition points at which to migrate an abusive player from an existing multi-player game session, in accordance with implementations of the disclosure. The multiplayer session 104 is hosted by the gaming service 100, as previously described, with players 122, 124, and 126 engaged in gameplay. It will be appreciated that a player of the video game will be connected to the multi-player session 104 through a player device, such as a game console, personal computer, laptop computer, tablet, cellular phone, or other computing device local to the player. Gameplay video is typically rendered on a display device, which may be incorporated into, or separate from, the player device. In the illustrated implementation, players 122, 124, 126, operate respective player devices 218, 222, and 226, which communicate over the network 216 with the multi-player session 104.

The player devices 218, 222, and 226 execute local sessions 220, 224, and 228, respectively, for the video game. Depending upon the multi-player gaming architecture, more or less of the processing and handling of the game state for the video game can be handled by the local sessions at the player devices versus the multi-player session at the server. In some implementations, the video game is entirely cloud executed, such that gameplay video (including image data and audio data) from the multi-player session 104 is streamed over the network to the player devices, with the local sessions handling presentation of the video (e.g. through displays and speakers) and gathering and sending input back up to the multi-player session. In some implementations, the video game is primarily executed by the local sessions, with each local session maintaining a local copy of the game state, and the multi-player session 104 enabling synchronization of the game states across the player devices. In some implementations, the video game is partially executed by the local sessions of the player devices, and partially executed by the multi-player session of the server.

As noted above, when an abusive player is detected, in some implementations, the abusive player is migrated to another server/session. However, in order to maintain continuity in the current session of the video game, in some implementations, the migration of the abusive player does not necessarily occur immediately upon determining that the abusive player will be migrated. Rather, an opportune time or breakpoint in the game is determined for the migration, so as to minimize the disruption to the abusive player and/or any of the remaining players in the multi-player session, and to minimize disruption of the existing gameplay and to preserve the continuity of events. In this way, transitioning an abusive player can be performed in an unobtrusive manner that may even be transparent to the abusive player and/or the other other players.

Accordingly, in some implementations, one or more qualifying transitional/significant/breakpoint events are detected, and the abusive player is transitioned to the new server/session upon the occurrence of a qualifying transitional event. The execution of the multi-player session generates a server game state 200 that is continually updated, using inputs from the user applied to the game engine to drive the gameplay. In order to detect events occurring during gameplay, game state data 202 (and/or game telemetry data) from the server game state 200 is obtained and analyzed using an event detection process 204 to identify when qualifying transitional events occur. In some implementations, game state data 202 may further include game state data and/or game telemetry data from any of the local sessions of the players.

Some non-limiting examples of qualifying transitional events or breakpoints include the following: death of the abusive player or another player (ref. 206); traversing or transitioning from one region of the game to another (ref. 208, e.g. opening or moving through a door/portal/entry/divider/etc., crossing a boundary, jumping between locations of a game map, etc.), completing a significant activity within the game story (ref. 210, e.g. completion of a stage/chapter/level/major event, defeating a boss character, solving a puzzle, achieving entry to a new region of the game space, one team defeating another team, one team scoring against another team, etc.), a period of low activity or low player-to-player interaction (e.g. period of no combat or no weapons firing by the abusive player and/or other players in the game, combat below a threshold level, etc.), pausing the game (ref. 212), etc. Upon detection of such a qualifying transitional event, then the detected abusive player is migrated to a new session/server (ref. 214). In other words, the migration of the detected abusive player does not necessarily occur immediately upon detection, but is delayed until a qualifying transitional event occurs, and then the migration is processed.

Thus, the migration of the abusive player is executed at a transitional moment in the game, so as to minimize intrusiveness of the migration. For example, upon the death of the abusive player, then the abusive player may be re-spawned into a new session/server. For example, when the abusive player moves through a door, the abusive player is migrated and in some implementations, arrives in the intended location in the game space (e.g. the other side of the door) but in a different session/server.

Figure 3:
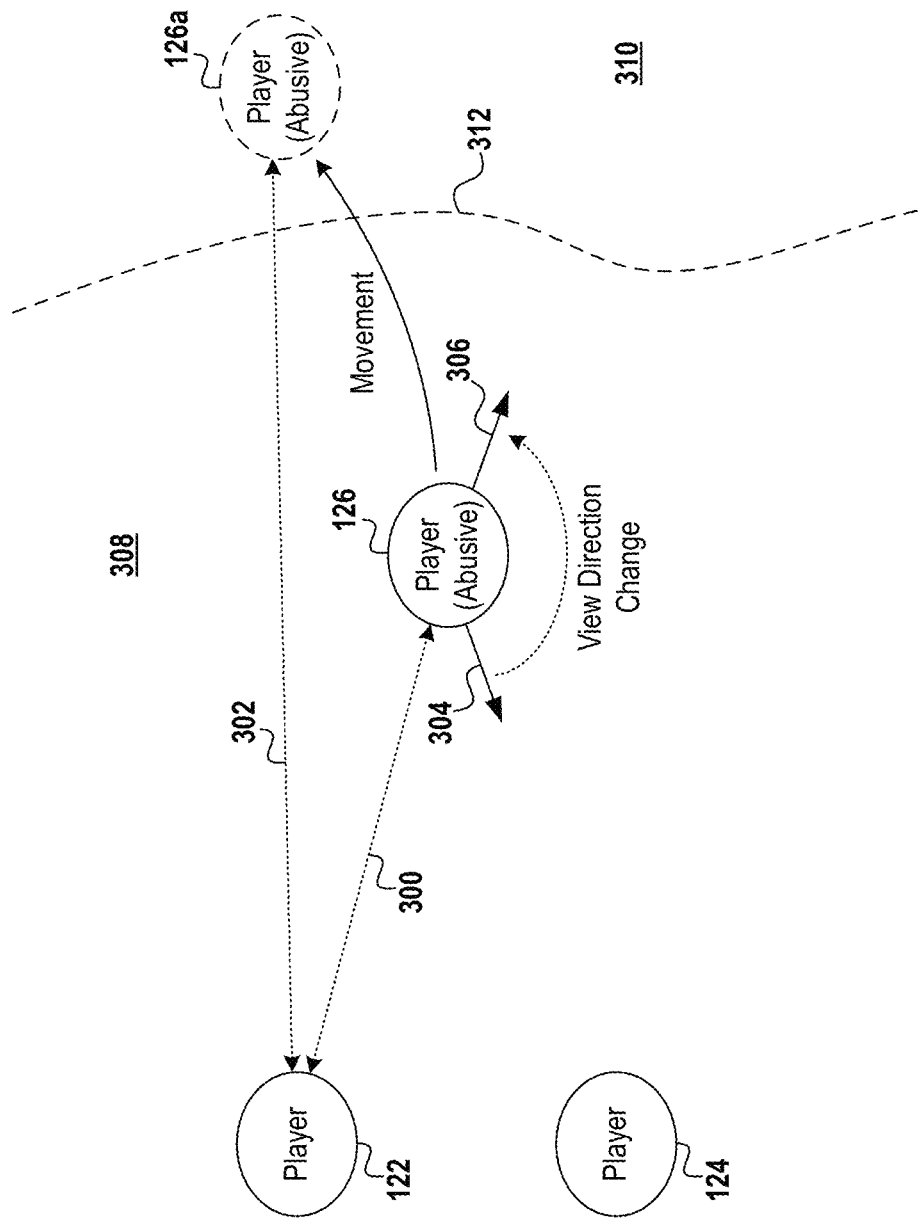
FIG. 3 conceptually illustrates using a spatial relationship of an abusive player to determine when to migrate the abusive player to another server/session, in accordance with implementations of the disclosure.

FIG. 3 conceptually illustrates using a spatial relationship of an abusive player to determine when to migrate the abusive player to another server/session, in accordance with implementations of the disclosure. As has been discussed, it is generally desirable to minimize the intrusiveness of migrating an abusive player. Thus, in some implementations, the spatial relationship of the abusive player to other players can be used to determine when to migrate the abusive user.

For example, in the illustrated implementation, the position/location of an abusive player 126 in a virtual space is shown relative to the other players 122 and 124. The abusive player 126 is positioned at a first distance 300 from the nearest player 122. In some implementations, at this stage, the abusive player 126, even though identified as abusive and slated for migration, is not migrated because the abusive player 126 is too close to the nearest player 122. That is, in some implementations, when the abusive player is within a predefined distance of the nearest other player, then migration does not occur. However, when the abusive player 126 moves to a position shown at ref. 126a, then the abusive user 126 is migrated to the new server/session. In other words, in some implementations, when the abusive player 126 moves beyond a predefined distance from the nearest other player, then the abusive player is migrated out of the current session to a new session. In this manner, the abusive player 126 is migrated when it is determined that the abusive player 126 is sufficiently alone or far enough away from the vicinity of other players.

In some implementations, when the abusive player 126 crosses from one region of the virtual space to another region of the virtual space, then the migration is initiated. For example, in the illustrated implementation, the player 126 moves from the region 308 to the region 310 of the virtual space. In some implementations, upon detecting the movement into the region 310, then the migration of the abusive player is initiated.

In some implementations, the view direction or view of the abusive player is analyzed and used, at least in part, to determine when to migrate the abusive player. For example, initially the abusive player 126 is shown having a view direction 304, that is towards at least the player 124, and such that the view may further include player 122. In some implementations, while the view direction or the view of the abusive player is directed towards another player, or while the abusive player's view of the virtual space includes another player, then the migration of the abusive player does not occur. However, when the abusive player's view direction is changed, for example to view direction 306 in the illustrated implementation, then the migration occurs. That is, when the view direction of the abusive player is away from other players, or when the abusive player's view does not include another player, then the abusive player is migrated.

In some implementations, the movement of the abusive player and/or the movements of other players, and/or the movements of the players relative to each other, are analyzed and used, at least in part, to determine when to migrate the abusive player. For example, in some implementations, the abusive player is not migrated until it is determined that the abusive player and any players within a predefined vicinity of the abusive player are moving away from each other. This can be based on determining that the abusive player is moving away from one or more of the other players, and/or determining that one or more of the other players is moving away from the abusive player. In some implementations, the velocity and/or acceleration of the movements of the players is also considered in determining when to migrate the abusive player. For example, the velocity and/or acceleration of the movements of the players relative to each other may amplify the effect of such movements in determining when to migrate the abusive player.

It will be appreciated that in some implementations, the above concepts can be combined. For example, in some implementations, the distance of the abusive player from the next nearest player, the view direction or view of the abusive player, and the movements of the players relative to each other are factors utilized to determine when the abusive player is migrated. For example, such factors can be quantified and combined into a score, and when the score exceeds a threshold amount, then the abusive user is migrated. In some implementations, the distance of the abusive player from the nearest player is positively correlated to the likelihood of migration occurring, such that as distance increases, so does the likelihood of migration of the abusive player. In some implementations, the extent to which the view direction of the abusive player is towards, or the view includes, another player, is negatively correlated to the likelihood of migration occurring, such that the more the view direction of the abusive player is towards, or the abusive player view includes, another player, the greater the likelihood of migration of the abusive player. In some implementations, relative movement of the abusive player and at least one other player away from each other increases the likelihood of the migration of the abusive player.

Figure 4:
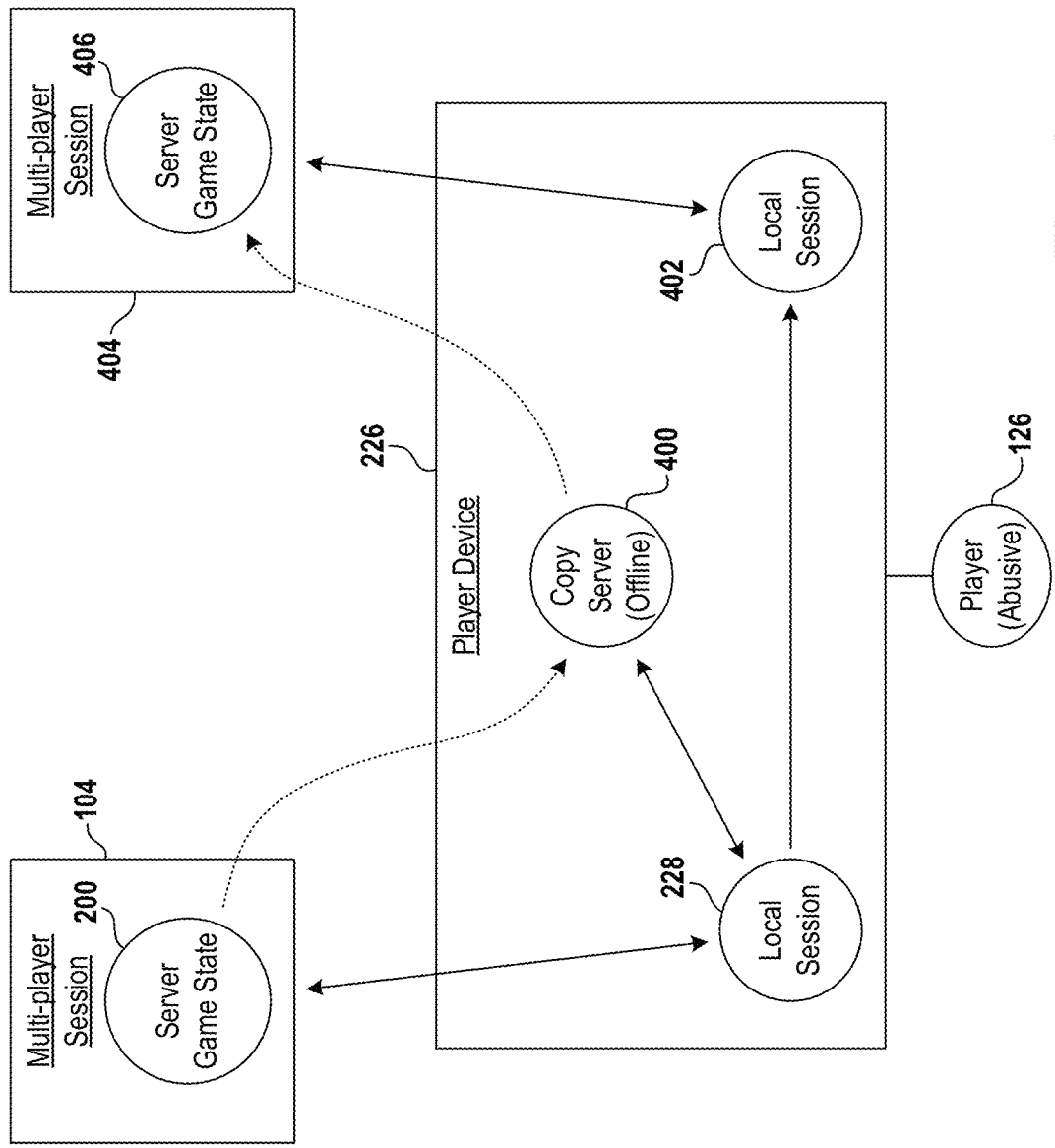
FIG. 4 conceptually illustrates implementation of an offline copy server to enable completion of interactions by an abusive player, in accordance with implementations of the disclosure.

FIG. 4 conceptually illustrates implementation of an offline copy server to enable completion of interactions by an abusive player, in accordance with implementations of the disclosure. For example, an abusive player may be in the middle of combat but has received enough flags or committed enough abuses to merit/require migration, and thus it is desirable to transition them to another server expediently while enabling the abusive player to complete combat or major interactions. Accordingly, in some implementations, a temporary offline copy server 400 is instantiated locally at the player device 226 to substantially replicate the gameplay experience of the multi-player session for the abusive player.

The copy server 400 obtains or copies at least a portion of the server game state 200 in order to substantially replicate aspects of the gameplay for the abusive player, and the local session 228 switches from communicating with the multi-player session 104 to communicating with the copy server 400. In this way the local session 228 of the abusive player 126 no longer communicates with the multi-player session 104, and thus the abusive player 126 can no longer interact in the multi-player session 104; yet the abusive player 126 can continue their gameplay in a substantially similar and continuous fashion to finish out combat or other major interactions in the world. It will be appreciated that the copy server 400 provides similar functionality to the multi-player session 104, so that the abusive player's local session 228 does not need to be adjusted in a significant way other than to be redirected to the copy server 400.

In some implementations, the copy server 400 instantiates AI bots to take the place of the other players from the multi-player session 104. In some implementations, the AI bots are configured so that it appears to the abusive player 126 that the other players are still playing in the same session.

In some implementations, after combat or other major interactions in the game world are completed using the copy server 400, then the abusive player is transitioned back to a live server/session, with actual players participating. For example, the initial local session 228 may be closed out, and a new local session 402 may be instantiated that connects to a different multiplayer session 404. In other implementations, the local session 228 continues and is transitioned to the multiplayer session 404. In some implementations, aspects from the copy server 400 are merged or added into the server game state 406 of the multiplayer session 404.

While the copy server 400 has been described as being locally executed, in some implementations, the copy server can be cloud-based, accessed over a network, and/or part of the gaming service 100.

Figure 5:
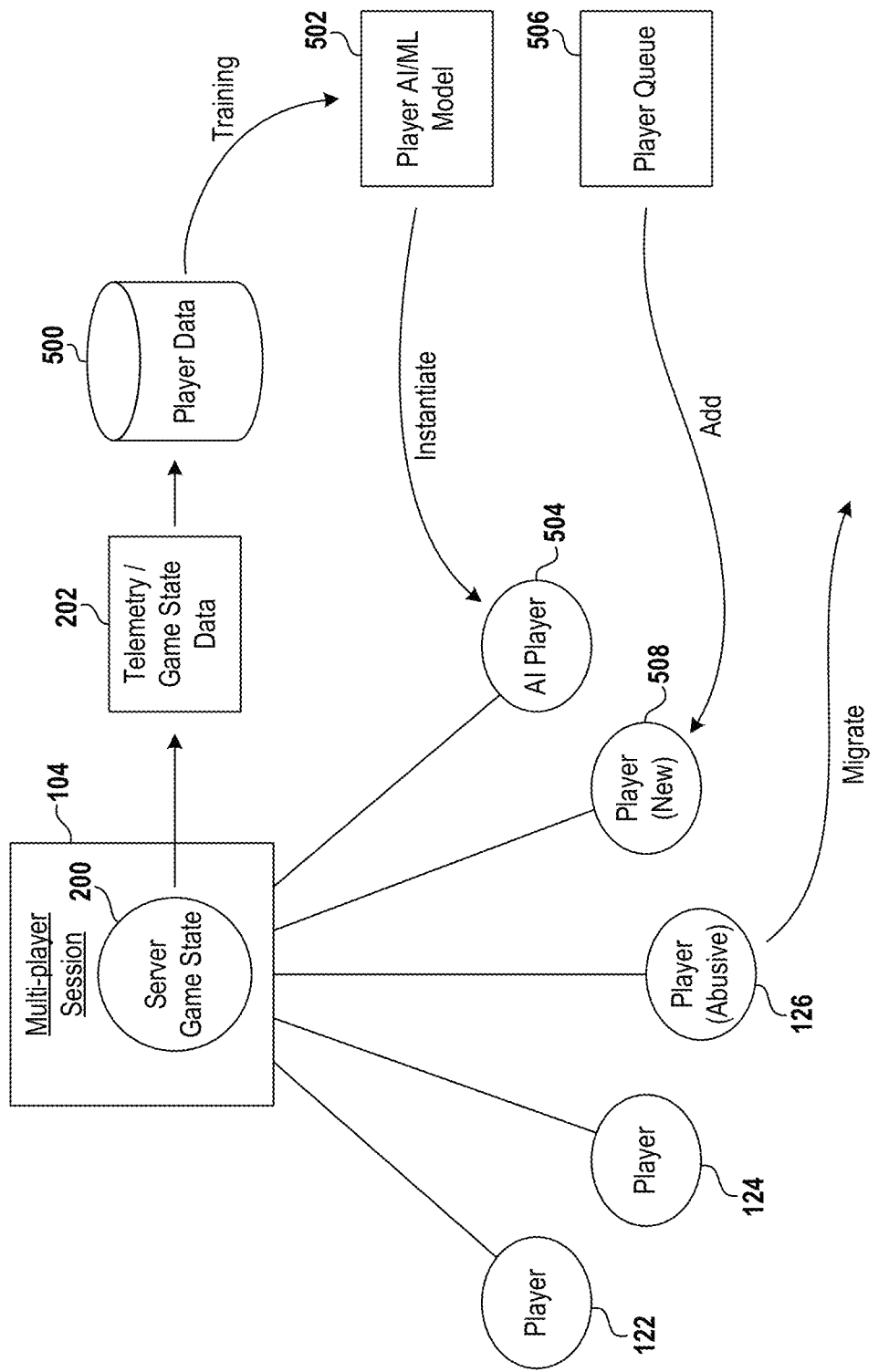
FIG. 5 conceptually illustrates using a machine learning model to substitute for an abusive player, in accordance with implementations of the disclosure.

FIG. 5 conceptually illustrates using a machine learning model to substitute for an abusive player, in accordance with implementations of the disclosure. In the illustrated implementation, the abusive player 126 has been identified and is migrated to a different session/server, so that the abusive player 126 will no longer engage in abusive behavior in the current multiplayer session 104. However, this raises the issue of how the remaining players 122 and 124, in the illustrated implementation, will continue gameplay in the absence of the abusive player 126. Accordingly, in some implementations, an AI player 504 replaces the abusive player 126 who has been migrated.

To provide the AI player 504, in some implementations, a player AI/machine learning model 502 is trained to behave like the abusive player 126. Telemetry data and/or game state data 202 is obtained from gaming sessions such as multiplayer session 104, and stored as player data 500. The player data 500 includes data regarding gameplay by the abusive player. The player data 500 is then used to train an AI/machine learning model 502 to behave in a similar manner in terms of gameplay as the abusive player. That is, the machine learning model 502 is trained using the recorded gameplay of the abusive player 126 so as to perform gameplay actions that are similar to those that would be performed by the abusive player 126. For example, given the recorded inputs provided by the abusive player in response to game situations and scenarios, the machine learning model 502 can be trained to provide the same or similar inputs in response to the same/similar situations and scenarios.

As will be appreciated, the player data 500 includes data describing game scenarios faced by the player 126 and data describing the player's responses such as controller inputs or other inputs. In some implementations, the player data 500 further includes video of the player's gameplay, and the machine learning model 502 is trained using the video to mimic the gameplay of the player 126 that is in response to scenes depicted by the video.

It will be appreciated that the machine learning model 502 is trained using the player's 126 recorded gameplay; however, the training of the machine learning model 502 is configured to avoid training machine learning model 502 to perform any abusive behaviors. To this end, in some implementations, data depicting scenarios in which abusive behavior took place are identified and scrubbed/removed from the training data set.

Accordingly, in some implementations, the trained machine learning model 502 is used to instantiate an AI player 504 in the multiplayer session 104 that replaces the abusive player 126 who is migrated to a different session. The AI player 504 thus is configured to engage in gameplay of the multiplayer session 104 with a similar style to that of the abusive player 126. It will be appreciated that the AI player 504 can be configured to have the same appearance and inventory as the abusive player 126 that was migrated, and be inserted at the same location and simultaneously as the abusive player 126 is being migrated out of the multi-player session, so that the replacement of the abusive player 126 with the AI player 504 is transparent to the other players 122 and 124 in the multiplayer session.

In some implementations, when the abusive player 126 is migrated out of the multiplayer session 104, then a new player is admitted to the multiplayer session 104 to replace the player 126. By way of example, in some implementations the gaming service may implement a player queue 506 in which players waiting to join a multiplayer session of the video game are queued. Accordingly, in some implementations, a new player 508 from the player queue 506 is added to the multiplayer session 104 when the abusive player 126 is migrated out of the session. In other implementations, players who may be interested in joining be multiplayer session 104 are notified and invited to join, such as through a messaging service, which may be implemented by the gaming service.

It will be appreciated that because the new player 508 is joining a multiplayer session in which other players have already been engaged in gameplay, the new player may be at a disadvantage relative to the other players who have already been playing. Accordingly, in some implementations, the new player 508 may be provided with contextual information about the multiplayer session 104 so that the new player 508 can enter the session with knowledge of the session and its gameplay. For example, the new player 508 can be given information about the setting/location/scene of the video game in which game play in the multiplayer session 104 occurs, a description of events which have occurred, statistics and other information about the other players, etc. In some implementations, the new player 508 can be shown video of preceding gameplay in the multiplayer session 104 so that the new player 508 can appreciate events which have occurred in the multiplayer session 104 prior to joining.

In some implementations, the new player 508 joins the multiplayer session 104 by assuming control of the character (or other representative virtual object) that was controlled by the abusive player 126 in the multiplayer session 104. In this way, the character associated with the abusive player 126 continues to exist in the multiplayer session 104, but is now operated and controlled by a different player. This helps to minimize the disruption to gameplay from the standpoint of the other players in the multiplayer session 104.

Figure 6:
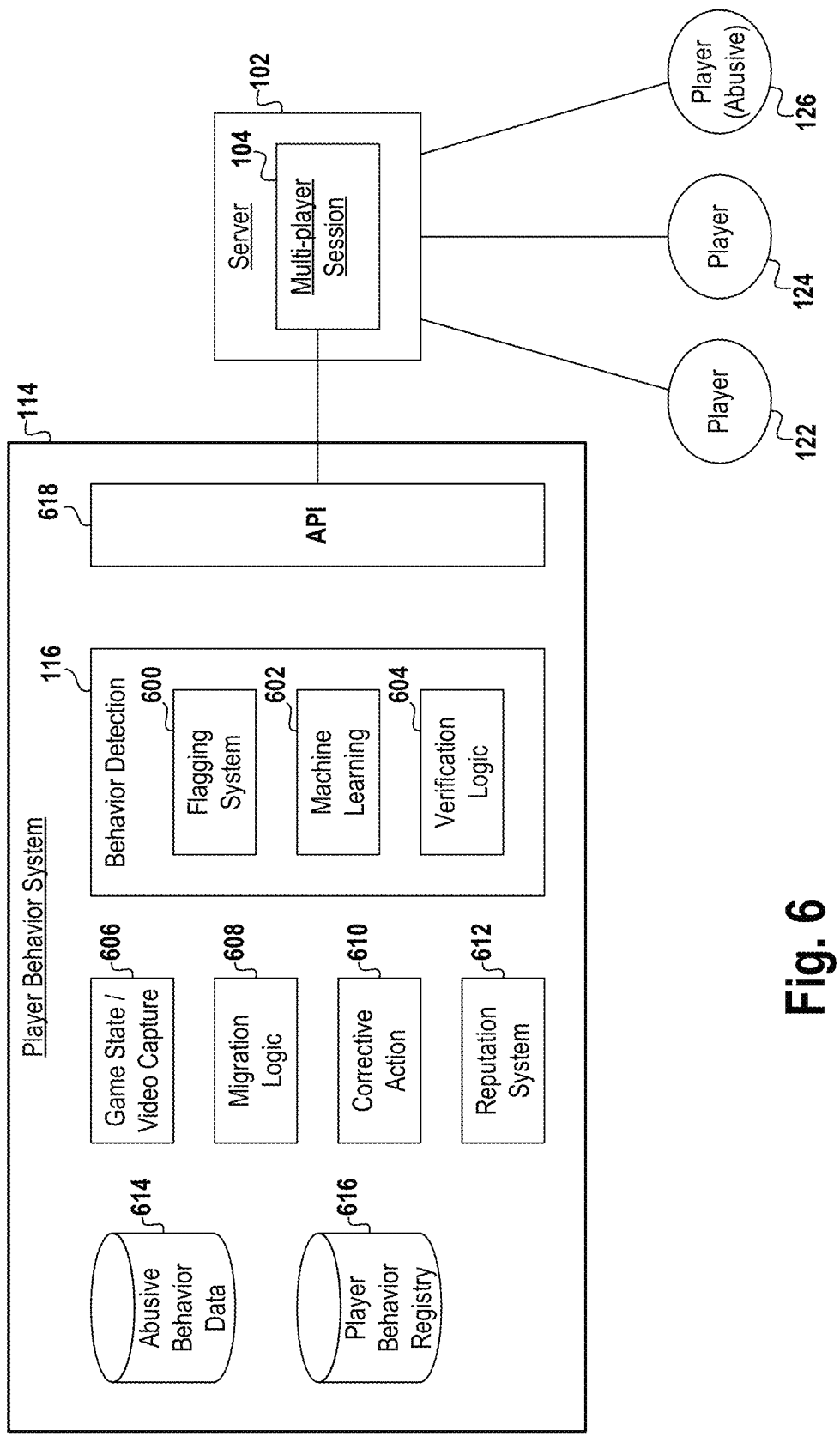
FIG. 6 conceptually illustrates a player behavior system for detecting and responding to abusive behavior in a multiplayer video game, in accordance with implementations of the disclosure.

FIG. 6 conceptually illustrates a player behavior system for detecting and responding to abusive behavior in a multiplayer video game, in accordance with implementations of the disclosure. In some implementations, the player behavior system 114 is implemented by the gaming service 100 as previously described. Componentry of the player behavior system 114 is now described with reference to the illustrative implementation. As previously described, the player behavior system 114 includes a behavior detection unit 116 for detecting abusive behavior on the part of players of a multiplayer video game.

In some implementations, users/players are enabled to report a player for bad or abusive behavior (e.g. AFK, chat harassment, griefing, spamming, etc.). To this end, the behavior detection unit 116 includes a flagging system 600, that is configured to enable players to flag abusive behavior when they encounter it. For example, during gameplay when a player wishes to flag another player for abusive behavior, they may press a button or open an interface to initiate flagging of the other player. In some implementations, the interface can enable the player to enter information describing the nature of the perceived abusive behavior. In some implementations such an interface can include predefined options which the recording player may select.

Additionally, when a flagging event is initiated, game state and video captures can be recorded as evidence of the potential bad behavior. For example, in some implementations, in response to the reporting player initiating flagging, then the reporting player is provided with an interface for identifying a portion of gameplay video that shows the alleged abusive behavior being reported. In some implementations, the interface enables the reporting player to trim existing gameplay video that has been buffered/recorded to identify the selected portion for flagging. Furthermore, corresponding game state data is captured, for example game state data corresponding to the time codes of the selected gameplay video identified by the reporting player.

In some implementations, when a player initiates flagging, then gameplay video and/or game state from a predefined duration prior to the initiation of flagging is automatically captured, e.g. by a game state/video capture unit 606, and stored to an abusive behavior data storage 614. For example, the immediately preceding N number of seconds of video and/or game state can be captured (e.g. N=5, 10, 20, 30, 45, 60, 90, 120, etc.) in some implementations. In some implementations, the duration captured and associated with the flagging event is dependent upon analyzing interactions occurring in the game play. For example, if the flagging event identifies a potentially abusive player, then the duration captured may be determined by analyzing the game state to identify the period of interactions involving the abusive player and the reporting player that immediately preceded the initiation of flagging. In other implementations, the duration captured is determined by analyzing the game state to identify the period of activity (e.g. a period of combat activity or other gaming interactions) that immediately preceded the initiation of flagging.

In some implementations, the captured gameplay video and/or game state further includes gameplay video and/or game state occurring after the reporting player has initiated a flagging event, such as for a predefined period following the flagging, or until a gaming activity involving the reporting player ceases or is completed (e.g. combat, completion of a significant event, etc.).

It will be appreciated that it is possible for a given player to falsely identify another player as exhibiting abusive behavior. Therefore, in some implementations, the behavior detection unit 116 further includes verification logic 604 that is configured to verify whether flagged behavior was actually bad or abusive behavior. In some implementations, the verification logic 604 employs a machine learning model 602 to determine if reported behavior was actually bad or abusive. In some implementations, the machine learning model is trained using a data set of abusive behaviours, so that the machine learning model is capable of determining whether a given scenario constitutes abusive behavior.

In some implementations, the verification logic 604 is configured to verify whether the reported behavior was abusive by polling other players in the game, such as players from the same team as the alleged abusive player, players from the opposite team, or a combination of players from both teams. Specifically, players may be presented with the recorded gameplay video showing the alleged abusive behavior, and requested to provide input indicating whether they believe that abusive behavior occurred. In some implementations, the alleged abusive behavior is verified if a majority of players polled indicate their belief that the behavior was indeed abusive.

In some implementations, both a machine learning model and polling of other players are utilized in combination to determine whether abusive behavior has occurred. For example, in some implementations, the machine learning model is used as a tie-breaker in the event equal numbers of players indicate the behavior to be abusive and non-abusive. In some implementations, the machine learning model and the players' indications are weighted factors used to ascertain whether the reported behavior was abusive. For example, players on the same team as the alleged abusive player may have their indications weighted more strongly than players on the opposing team. In some implementations, players with higher reputations have their indications accorded higher weighting than the indications of players with lower reputations. In various implementations, the determination of the machine learning model can be weighted to a greater or lesser extent than the indications of some or all of the players.

In some implementations, the behavior detection unit 116 can automatically report or flag a player for bad behavior. For example, the machine learning model 602 can be trained to recognize abusive behavior, and then be applied to run on current multiplayer gaming sessions and flag bad behavior. In some implementations, the alleged abusive behavior flagged by the machine learning model is verified by the verification logic 604, such as by presenting the flagged behavior (e.g. presenting video) to the alleged player's teammates and asking them for their judgement regarding whether they think the flagged behavior was actually abusive or not.

It will be appreciated that video and/or game state capture can be performed for behavior flagged by the machine learning model, and stored to the abusive behavior data storage 614. Captured data for identified abusive behavior (whether identified by a player or identified by the machine learning model), and especially verified abusive behavior, can be used to further train the machine learning model, so that over time the machine learning model improves its recognition of abusive behavior, both in terms of scope and accuracy.

As has been described, in some implementations, when abusive behavior is detected, then migration logic 608 is engaged to migrate the abusive player to a different session/server.

In some implementations, when abusive behavior is detected, then a corrective action is implemented by a corrective action unit 610, the corrective action being configured to prevent the abusive behavior from reoccurring or motivate the abusive player not to engage in the abusive behavior. In some implementations, the abusive player can be notified that they have been reported for bad behavior (e.g. if the behavior has been verified as bad by the machine learning model). In some implementations, the abusive player is informed of what it was they were determined to have been doing wrong. This can be configured to allow them to learn from their mistakes or else be banned (e.g. temporarily or permanently).

In some implementations, the video game can access the above-described functionality and data, through API 618, so that the video game may implement its own corrective actions and systems. For example, the video game may implement its own "3 strikes" system.

In some implementations, corrective actions can be performed at the gaming service system side with temporary bans from the gaming service or the specific game for bad behavior.

It will be appreciated that in various implementations, various corrective actions can be performed in response to detecting and/or verifying abusive behavior. For example, in some implementations, some functionality of an abusive player is reduced, disabled or turned off, e.g. text/keyboard chat, voice/mic chat, camera, microphone, etc. In some implementations, such functionality is disabled for a predefined period of time, until a significant event occurs, or until the session ends. In some implementations, such functionality is disabled specifically in relation to a given player that is a victim of or reports the abusive behavior, e.g. not allowing the abusive player to engage in keyboard chat or voice chat with the victim/reporting player.

In some implementations, an abusive player is masked or otherwise socially removed from another player (victim or reporting player). In some implementations, the abusive player is made invisible or transparent so that the other player no longer sees the abusive player in the game. In some implementations, the other player is made invisible to the abusive player so that the abusive player can no longer see the other player.

In some implementations, the abusive player is socially removed by moving them to another location in the game world.

In some implementations, the appearance of an abusive player is changed, such as by coloring or changing their avatar's appearance in some way, which may provide an indicator of bad reputation.

In some implementations, respawning of an abusive player is slowed or subject to a time delay. In some implementations, prior to respawning, a tutorial is presented to the abusive player explaining why they've been penalized.

In some implementations, an abusive player is deprioritized in the queues for the game, such by delaying, slowing, or withholding them joining multiplayer matchmaking queues. In some implementations, the abusive player is prevented or withheld from joining sessions having characteristics or players that the abusive player has previously abused.

In some implementations, the tool tips of the abusive player are changed to include tips on being less rude or otherwise avoiding abusive behavior.

It will be appreciated that the particular corrective action applied in a given instance may depend upon the specific abusive behavior that was detected. For example, the chosen corrective action can be configured to prevent the abusive behavior from reoccurring. In some implementations, a mapping is established between different types of abusive behavior situations and different types of corrective actions to be applied in response.

Furthermore, the degree of the corrective action can be adjusted depending upon the severity of the abusive behavior or situation. For example, in some implementations, the length or scope of feature disablement increases with abuse severity, so that for more severe abuses, feature/functionality disablement can be imposed for longer periods of time or for more features, whereas for less severe abuses the feature/functionality disablement may be imposed for shorter periods of time or for fewer features. In the case of migration, the migration of the abusive player may be more or less abrupt depending upon the severity of the abusive behavior, with more severe abusive behavior meriting more abrupt migration, and less severe abusive behavior meriting more transparent and fluid migration.

Similar concepts can apply to abusive players that continue to engage in abusive behavior despite one or more warnings. For example, abusive behavior by an offender after one or more warnings can be considered more severe than a first instance of abusive behavior that is not preceded by a warning.

Furthermore, there may be varying levels of what is considered abusive by the system, which can be implemented, for example, through the machine learning model and/or the verification process. Behavior detection can be tuned to be more highly sensitive or less sensitive to abusive behavior, e.g. by the video game, by a host player of a given session, etc. In some implementations, the severity of the behavior can be adjusted based on various factors. For example, if a player is accused by a smaller number of players for the first time, then such behavior may be considered less severe than if the player is a repeat offender after having received warnings.

Players may have varying levels of sensitivity in terms of what they perceive to be bad behavior. Therefore, in some implementations, player reporting/flagging can be tracked and analyzed to determine how sensitive a given player is to various types of behavior. Accordingly, the sensitivity of the reporting player can be a factor or weight used in considering whether an alleged abusive behavior incident has occurred and the severity of such an incident. For example, some players may be overly sensitive and have a tendency to falsely accuse, and so by adjusting the sensitivity level for that player, the system can better filter out false accusations.

In some implementations, there can be flexible penalties for abusive behavior. For example, in some implementations, the abusive player can be presented with options to encourage better behavior. For example, in the case of a respawning delay as a penalty, the abusive player can be presented with the option to (a) accept the delay in respawning, or (b) respawn immediately if they agree not to commit any more abuses, but also agree to a more severe penalty (for example, longer delay in respawning or removal from the session) if a further abuse is detected. In this manner, the abusive player has the option of reducing or eliminating a penalty for recent behavior, in exchange for agreeing to accept a worse penalty if abusive behavior is detected in the future.

It may also be important to protect a given player from retribution for flagging another player. Thus, in some implementations, the reporting player may be hidden from view by the abusive player. In some implementations, the screen name of the reporting player is blurred or otherwise made not visible. In some implementations, the reporting player is reminded about their privacy settings, as there could be information in their profile that is exposed. Thus, the reporting player may be notified about information in their public profile that could expose them to retribution.

In some implementations, the player behavior system implements a reputation system 612 through which players' reputations are managed. In some implementations, the reputation system 612 is a point-based system, in which players acquire reputation points, with the higher the number of reputation points then the better the reputation; and the lower the number of reputation points, then the worse the reputation. In some implementations, players that exhibit good behavior, or do not engage in bad behavior, acquire positive reputation points for their good behavior; whereas players that exhibit bad behavior acquire negative reputation points, which reduce their reputation points. In some implementations, to disincent players from making false reports, players may be penalized (e.g. receive negative reputation points) if they wrongly accuse another player of bad behavior. In some implementations, the reputation system 612 stores information pertaining to players' reputations to a player behavior registry, including their reputation information/points, their reputation history, any bad behavior incidents/events, etc.

It will be appreciated that it is important to provide a mechanism for an abusive player to rebuild/rehabilitate their reputation, so that they are not permanently affected by a penalty for abusive behavior. Thus, in some implementations, players increase their reputations by exhibiting good behavior, and after so many hours without any abuse/flags, their reputations are automatically increased, for example, by adding points to their reputation. Thus, an abusive player can restore their reputation over time by not engaging in abusive behavior.

Figure 7A:
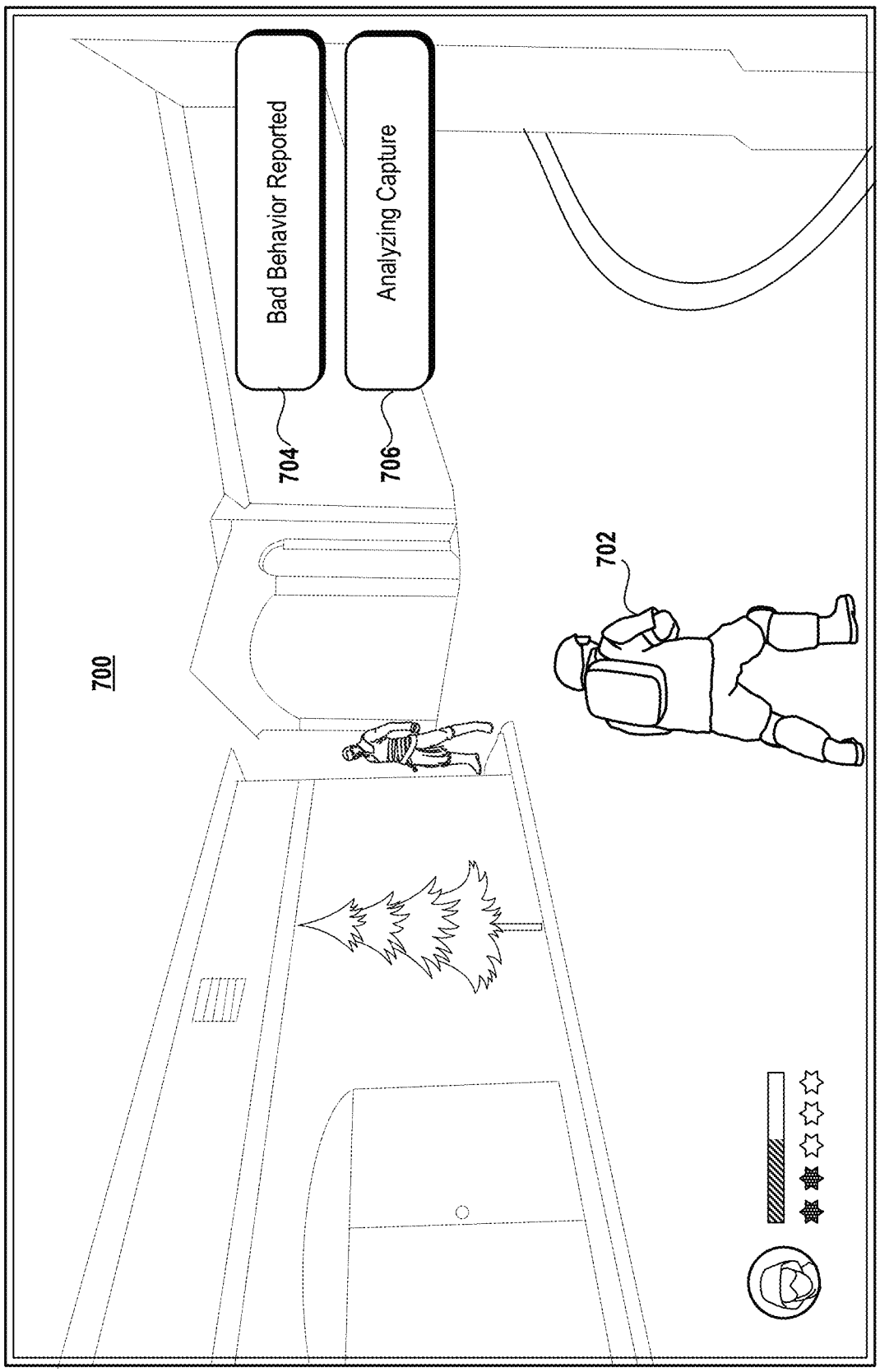
FIG. 7A illustrates a player view of a scene of a video game, for which the player is being flagged for abusive or bad behavior, in accordance with implementations of the disclosure.

FIG. 7A illustrates a player view of a scene of a video game, for which the player is being flagged for abusive or bad behavior, in accordance with implementations of the disclosure. In the illustrated implementation, a player view of a scene 700 of a multiplayer video game is shown. The player is represented by a virtual character 702, which the player controls or operates during gameplay.

In the illustrated implementation, the player has been reported/flagged for abusive or bad behavior, and accordingly, pop-up notifications 704 and 706 are presented in the player's view. The player may have been reported by another player, or by the behavior detection system itself, e.g. using a machine learning model. The notification 704 indicates that bad behavior has been reported, and the notification 706 further indicates that captured data of the alleged bad behavior is being analyzed, for example, to determine the nature of the bad behavior and verify it. The pop-up notifications/messages can appear immediately upon the player being flagged, so that the player is notified about the reported bad behavior as soon as it is reported. It will be appreciated that the pop-up notifications can be small notifications in-game, so as not to be overly disruptive to the player's gameplay or obscure too large a portion of the player's field of view.

FIG. 7B illustrates the player view of the video game after analysis of the captured data, in accordance with the implementation of FIG. 7A. As shown, if the behavior is confirmed/verified as constituting abusive behavior, then more information is displayed to the player. For example, a larger notification 708 is presented with further explanation. Such a larger notification 708 can be presented during a time when interference with gameplay is unlikely, such as after the game is over, or during a time of low activity (e.g. low or no combat activity). In some implementations, the additional information about the bad behavior is also sent to the player through other messaging platforms, such as a gaming platform messaging system, e-mail, phone text message, social network messaging, chat services, other electronic inboxes, etc. It will be appreciated that in some implementations, notifications and information about abusive behavior can be communicated using voice audio, which can be presented to the player during or after gameplay.

In the illustrated implementation, the notification 708 indicates to the player that they have been flagged for bad behavior during a specific game. A more detailed description of the specific behavior that was determined to be abusive is provided. Also, ramifications of the behavior are indicated, for example, that the player will be suspended from the gaming service/network if they reach a certain number of instances of bad behavior. The notification 708 further includes a link to more details or to watch video of what the player was reported as doing. In some implementations, the video is made accessible through pressing a controller button.

Additionally, the notification 708 further indicates that the user can indicate that they disagree. In some implementations, the player can press a button to indicate they believe they have been falsely reported. In some implementations, indicating such disagreement may trigger further verification, such as verifying whether the behavior was abusive by asking other players. In some implementations, in order to prevent abuse of such an option, the penalty may be more severe if the player indicates disagreement and the alleged bad behavior is later confirmed as abusive through additional verification.

As described, in some implementations, a weighting function is applied to determine whether behavior is deemed to be bad or abusive and/or the severity of any penalty to be imposed. For example, a third party complaint might not be weighted as highly as a complaint/flag from a member of the player's own team. Also, different actions (e.g. AFK, griefing, chat abuse, etc.) may be weighted differently.

Furthermore, in some implementations, a machine learning model may be applied to earlier portions of gameplay to identify any prior instances of abuse. Perhaps the time it was reported was only the last or most recent time it was done. However, there may have been previous instances, and the machine learning model could identify these. It will be appreciated that analyzing an entire video or game state capture from a gaming session may be very resource intensive. Thus, in some implementations, in order to reduce the amount of processing required, the machine learning system could determine times of interaction between players (e.g. between the accused player and any other players) to determine possible times when abuse would have been possible. Similarly, the machine learning system could determine other times of specific situations or conditions during which certain bad behavior are possible, and such times would be analyzed to determine where such behavior occurred.

Figure 8A:
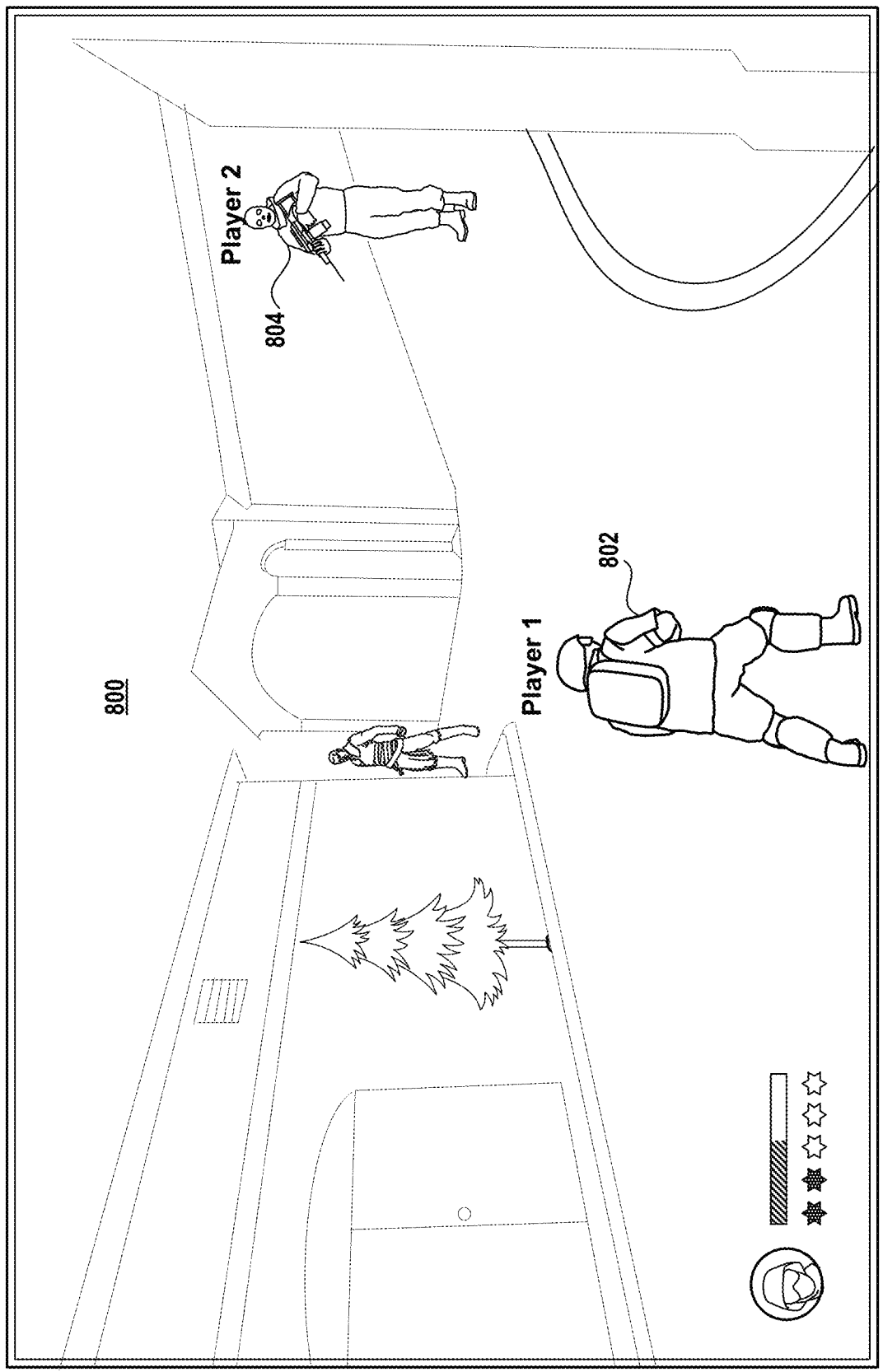
FIGS. 8A and 8B illustrate application of an automatic recognition system that identifies possible abusive behavior to facilitate reporting by players during gameplay, in accordance with implementations of the disclosure.
Figure 8B:
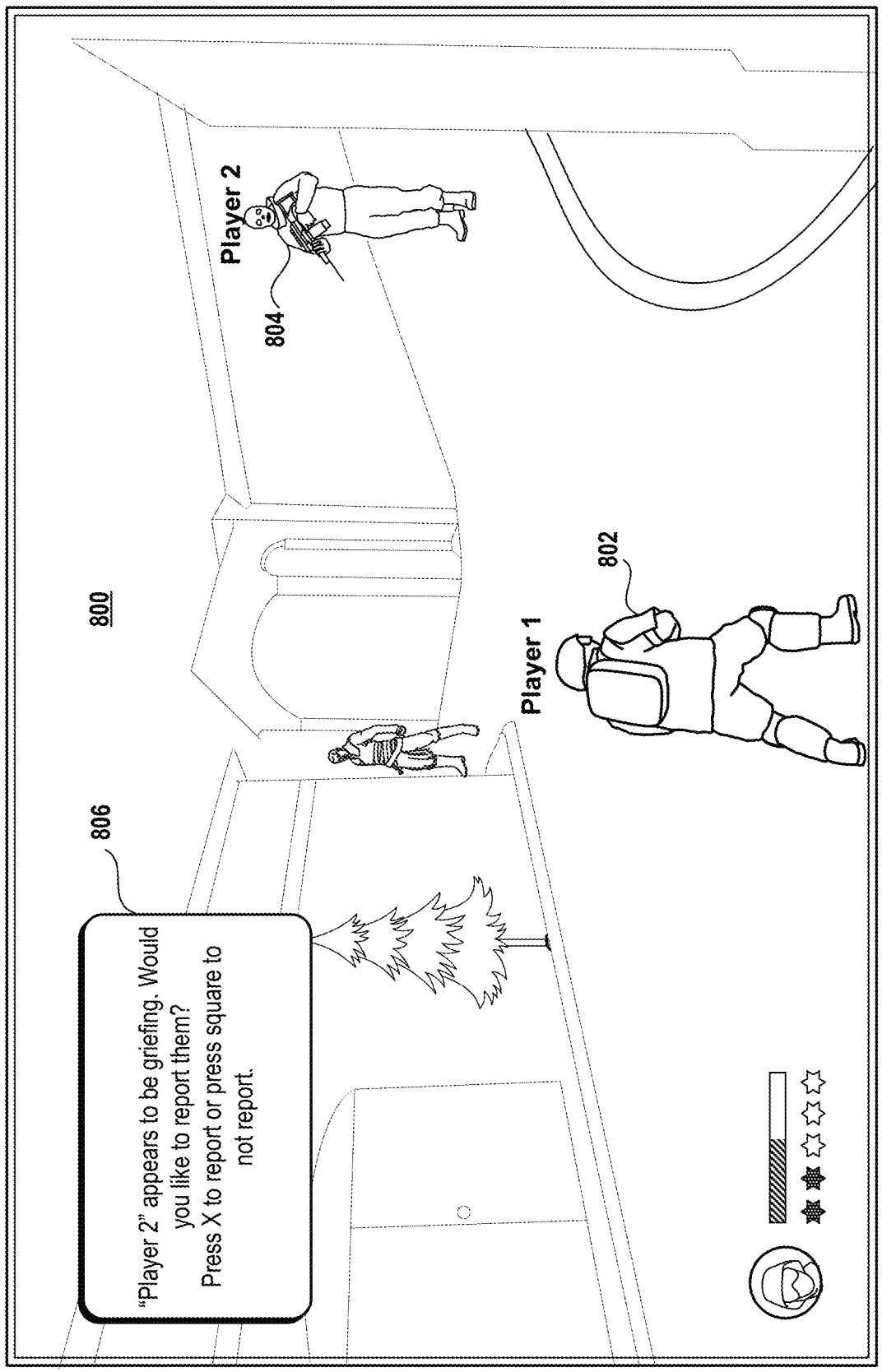

FIGS. 8A and 8B illustrate application of an automatic recognition system that identifies possible abusive behavior to facilitate reporting by players during gameplay, in accordance with implementations of the disclosure. For example, at FIG. 8A, a player view of a scene 800 of a multiplayer video game is shown. The player view is that of a first player that is represented by first virtual character 802 in the illustrated implementation. Also shown in the player view is another virtual character 804 of a second player. By way of example without limitation, the second player may be currently "griefing" or no longer trying to help win the match in the multiplayer game. A problem with reporting abusive behavior is that it is generally cumbersome to report, requiring time and attention of the reporting player, which is impractical in-game, and may be especially difficult to type out and describe using a console game system without a keyboard.

Therefore, in some implementations, the player behavior system implements automatic recognition of potentially abusive behavior during gameplay, and brings it to the attention of one or more players in the game. For example, as shown at FIG. 8B, the system has determined that the second player is potentially engaging in bad behavior and therefore, a pop-up notification 806 appears in the player view of the first player. The notification 806 indicates that the second player appears to be griefing, and inquires whether the first player would like to report them. By way of example without limitation, specific buttons may be pressed to either proceed with reporting or to not report the second player.

In this manner, the reporting of bad behavior by other players can be made more frictionless, as the player does not even have to specify what the abusive player is doing, as it is being recognized automatically. This is significant as reporting abusive behavior is otherwise very high friction, and much abusive behavior would go unreported simply because of the hassle of filing a report. It will be appreciated that in a machine learning system, as players flag other players, the data (e.g. game state and video captures) can be gathered to form a training data set, and machine learning can be trained to recognize and classify various types of abusive behavior during an active gaming session in substantial real-time in some implementations. And because the machine learning model automatically recognizes the abusive behavior, reporting by players is made significantly more frictionless.

In some implementations, when a player indicates abusive behavior has occurred, such as by hitting a button, then a preceding time period (e.g. previous 30 seconds) is analyzed by the machine learning model to determine whether and what type of abusive behavior occurred. Again, the reporting player need not specify exactly what abusive behavior occurred, but rather the machine learning system can determine the type and details of the abusive behavior, and present the results to the reporting player for confirmation.

In some implementations, other triggers of potentially bad behavior can be recognized. For example, a player may verbally express frustration or anger with another player that is engaging in abusive behavior. Therefore, in some implementations, a player's verbal expression is recognized (e.g. through the player's microphone/headset; using voice recognition) by the system and this triggers analysis by the machine learning model to determine whether and what abusive behavior occurred. In some implementations, other player cues are recognized, such as their gestures and facial expressions (e.g. through a player-facing camera; using facial/gesture recognition).

In some implementations, the machine learning model can be trained from prior gameplays so as to understand the proper mechanics for given scenarios of a video game. Thus, the machine learning model is enabled to recognize when player behavior deviates from the proper mechanics, which may constitute bad or abusive behavior.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("TOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
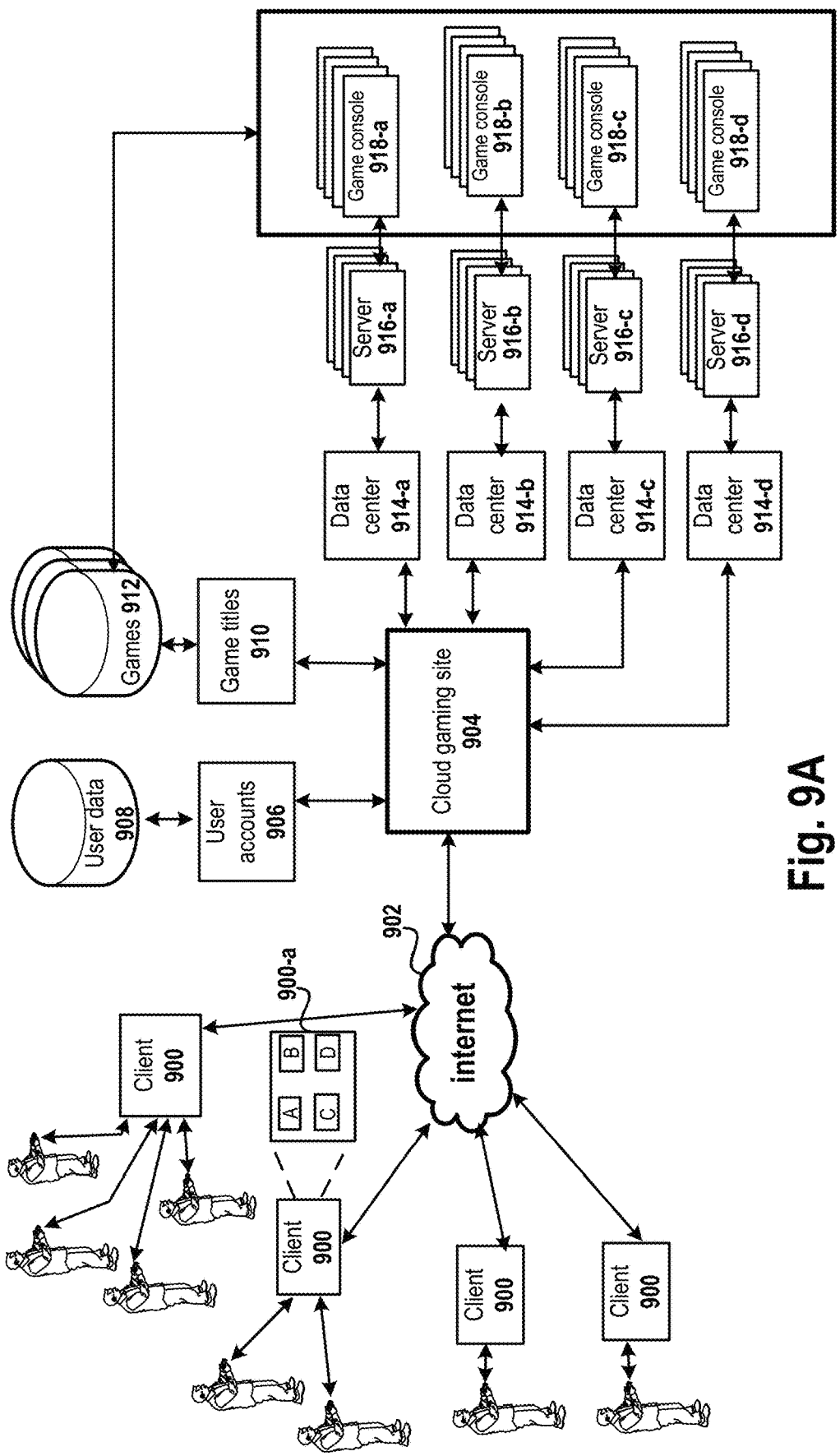
FIG. 9A illustrates an exemplary system used to load game files for a game available through a cloud gaming site, in accordance with implementations of the disclosure.

FIG. 9A illustrates an exemplary system used to load game files for a game available through a cloud gaming site. The system includes a plurality of client devices 900 that are communicatively connected to the cloud gaming site 904 over a network 902, which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-*a*, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
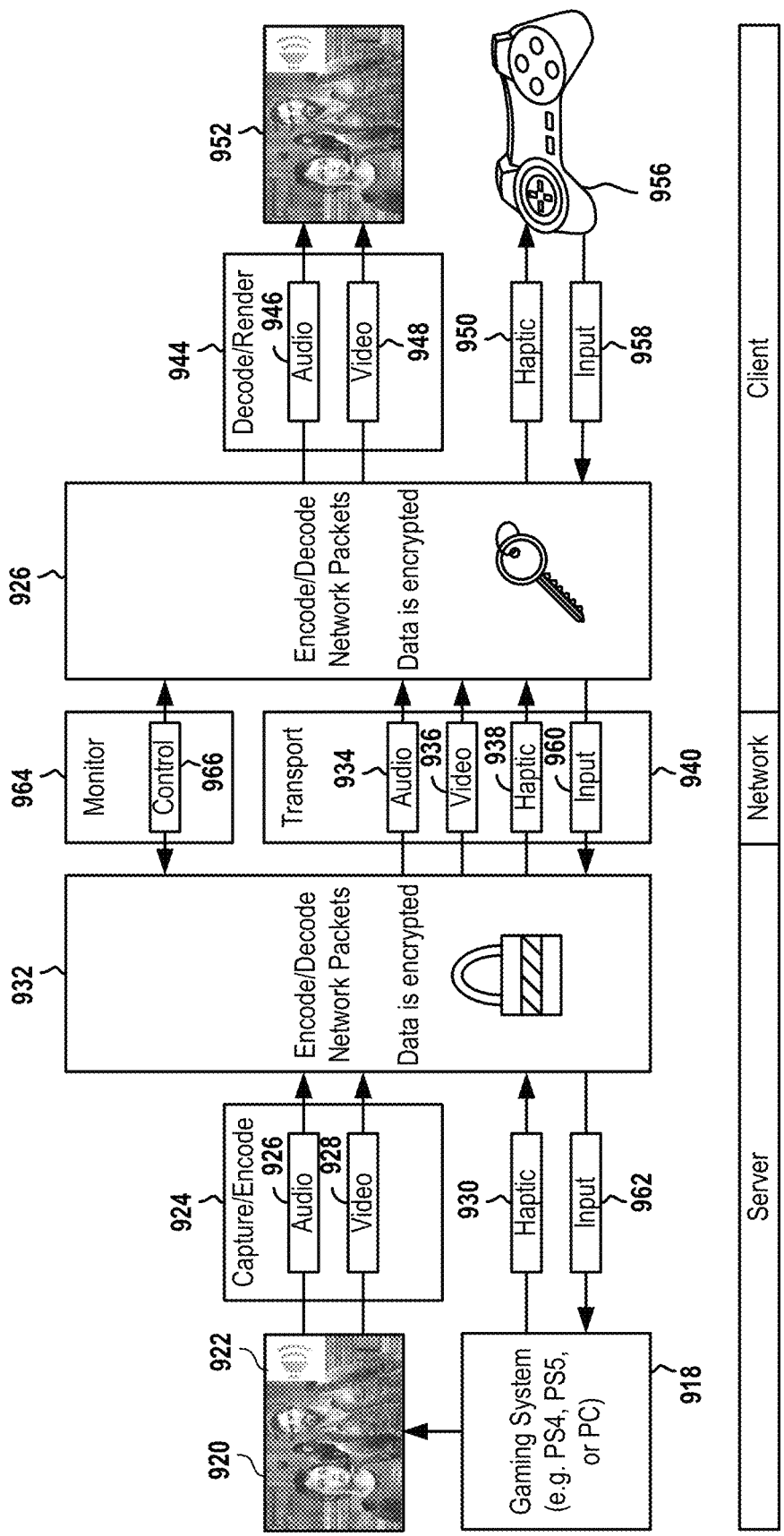
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method performed by at least one server computer, comprising:
    during interactive gameplay of a first session of a multi-player video game, processing game state data to identify gameplay activity of a player as being abusive;
    responsive to the identifying the gameplay activity as being abusive, then migrating the player to a second session of the multi-player video game;
    wherein further responsive to identifying the gameplay activity as being abusive, then identifying a breakpoint in the interactive gameplay, the migrating being performed upon reaching the breakpoint;
    wherein the breakpoint is defined by one or more of a completion of a stage or event of the multi-player video game, a transition between spaces of a virtual environment by the player, a death of the player in the interactive gameplay.

2. The method of claim 1, wherein migrating the player includes capturing settings associated to the player in the first session, and initiating the player in the second session with the captured settings.

3. The method of claim 1, wherein migrating the player includes capturing a state of the first session of the multi-player video game, and configuring the second session to substantially replicate at least a portion of the state of the first session in the second session without other players of the first session.

4. The method of claim 1, wherein identifying the gameplay activity of the player as being abusive includes receiving a flag initiated by a second player of the multi-player video game in response to the gameplay activity of the player.

5. The method of claim 1, wherein identifying the gameplay activity of the player as being abusive includes analyzing in real-time, by a machine learning model, the interactive gameplay of the multi-player video game.

6. A method performed by at least one server computer, comprising:
    during interactive gameplay of a first session of a multi-player video game, receiving a flag initiated by a first player of the multi-player video game in response to gameplay activity of a second player, the flag configured to identify the gameplay activity of the second player as potentially abusive;
    responsive to receiving the flag, processing recorded gameplay of the multi-player video game to verify the gameplay activity of the second player as being abusive;
    responsive to the verifying the gameplay activity of the second player as being abusive, then migrating the second player to a second session of the multi-player video game;
    wherein further responsive to verifying the gameplay activity of the second player as being abusive, then identifying a breakpoint in the interactive gameplay, the migrating being performed upon reaching the breakpoint;
wherein the breakpoint is defined by one or more of a completion of a stage or event of the multi-player video game, a transition between spaces of a virtual environment by the second player, a death of the second player in the interactive gameplay.

7. The method of claim 6, wherein migrating the second player includes capturing settings associated to the second player in the first session, and initiating the second player in the second session with the captured settings.

8. The method of claim 6, wherein migrating the second player includes capturing a state of the first session of the multi-player video game, and configuring the second session to substantially replicate at least a portion of the state of the first session in the second session without other players of the first session.

9. The method of claim 6, wherein verifying the gameplay activity of the second player as being abusive includes analyzing, by a machine learning model, the interactive gameplay activity of the second user.

10. A method performed by at least one server computer, comprising:
during interactive gameplay of a first session of a multi-player video game, processing game state data to identify gameplay activity of a player as being abusive;
responsive to the identifying the gameplay activity as being abusive, then migrating the player to a second session of the multi-player video game;
wherein migrating the player includes capturing a state of the first session of the multi-player video game, and configuring the second session to substantially replicate at least a portion of the state of the first session in the second session without other players of the first session.

11. A method performed by at least one server computer, comprising:
during interactive gameplay of a first session of a multi-player video game, receiving a flag initiated by a first player of the multi-player video game in response to gameplay activity of a second player, the flag configured to identify the gameplay activity of the second player as potentially abusive;
responsive to receiving the flag, processing recorded gameplay of the multi-player video game to verify the gameplay activity of the second player as being abusive;
responsive to the verifying the gameplay activity of the second player as being abusive, then migrating the second player to a second session of the multi-player video game;
wherein migrating the second player includes capturing a state of the first session of the multi-player video game, and configuring the second session to substantially replicate at least a portion of the state of the first session in the second session without other players of the first session.

* * * * *